(12) United States Patent
Schmüdderich

(10) Patent No.: US 10,583,831 B2
(45) Date of Patent: Mar. 10, 2020

(54) METHOD AND SYSTEM FOR PREDICTIVE DRIVER ASSISTANCE USING COMMUNICATION AND VEHICLE EQUIPPED WITH SUCH SYSTEM

(71) Applicant: HONDA RESEARCH INSTITUTE EUROPE GMBH, Offenbach/Main (DE)

(72) Inventor: Jens Schmüdderich, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/963,843

(22) Filed: Dec. 9, 2015

(65) Prior Publication Data

US 2016/0229395 A1    Aug. 11, 2016

(30) Foreign Application Priority Data

Feb. 9, 2015    (EP) ..................................... 15154287

(51) Int. Cl.
*B60W 30/08* (2012.01)
*G08G 1/16* (2006.01)
(Continued)

(52) U.S. Cl.
CPC .............. *B60W 30/08* (2013.01); *B60Q 1/14* (2013.01); *B60Q 1/46* (2013.01); *B60Q 1/50* (2013.01);
(Continued)

(58) Field of Classification Search
CPC ...... B60W 30/08; B60W 10/04; B60W 10/20; B60W 30/18163; B60W 10/18;
(Continued)

(56) References Cited

U.S. PATENT DOCUMENTS

| 2004/0090317 A1* | 5/2004 | Rothkop ................ B60Q 9/008 340/435 |
| 2005/0187713 A1* | 8/2005 | Yamamura ............. G08G 1/167 701/301 |
| 2009/0278678 A1 | 11/2009 | Krotkov |
| 2010/0228419 A1 | 9/2010 | Lee et al. |
| 2011/0054793 A1 | 3/2011 | Harada et al. |

(Continued)

FOREIGN PATENT DOCUMENTS

| DE | 100 05 499 A1 | 8/2001 |
| DE | 10 2006 050 546 A1 | 4/2008 |

(Continued)

OTHER PUBLICATIONS

Translation of DE102007041436A1 obtained via Espacenet on Apr. 12, 2018 (Year: 2009).*

(Continued)

*Primary Examiner* — Jeffrey C Boomer
(74) *Attorney, Agent, or Firm* — Squire Patton Boggs (US) LLP

(57) ABSTRACT

A method and a system for communicating a an ego-vehicle's determined behavior to a target object is for use in a driver assistance system of a vehicle. The method includes steps of acquiring data of a traffic scene preferably by sensor means configured to sense an environment of the vehicle, calculating a prediction result including a target object's behaviour based on the acquired sensor data, determining an action of the host vehicle based on the prediction result and generating an actuation signal for performing the determined action, and determining a communication information indicating the determined action. The communication information is output to a communication means for communication to the target object via at least one of a lighting means of the vehicle and a car-to-x communication means.

10 Claims, 8 Drawing Sheets

(51) Int. Cl.
*B60Q 1/14* (2006.01)
*B60Q 1/46* (2006.01)
*B60Q 1/50* (2006.01)
*B60W 10/04* (2006.01)
*B60W 10/18* (2012.01)
*B60W 10/20* (2006.01)
*B60W 30/18* (2012.01)

(52) U.S. Cl.
CPC ............ *B60W 10/04* (2013.01); *B60W 10/18* (2013.01); *B60W 10/20* (2013.01); *B60W 30/18163* (2013.01); *G08G 1/161* (2013.01); *G08G 1/162* (2013.01); *G08G 1/166* (2013.01); *G08G 1/167* (2013.01); *B60W 2550/30* (2013.01); *B60W 2710/18* (2013.01); *B60W 2710/20* (2013.01); *B60W 2720/10* (2013.01); *B60W 2900/00* (2013.01)

(58) Field of Classification Search
CPC ......... B60W 2710/18; B60W 2720/10; B60W 2900/00; B60W 2710/20; B60W 2550/30; B60Q 1/14; B60Q 1/50; B60Q 1/46; G08G 1/166; G08G 1/161; G08G 1/62; G08G 1/167; G08G 1/162
See application file for complete search history.

(56) References Cited

U.S. PATENT DOCUMENTS

2012/0025969 A1* 2/2012 Dozza ..................... B60Q 1/44
340/463
2013/0054089 A1 2/2013 Nordbruch et al.
2013/0054106 A1* 2/2013 Schmudderich .. B60W 30/0956
701/96

FOREIGN PATENT DOCUMENTS

| DE | 21 2006 000 065 U1 | 7/2008 | |
| DE | 102007041436 A1 * | 3/2009 | ............ B60Q 1/444 |
| DE | 10 2011 081 394 B3 | 10/2012 | |
| EP | 2 384 932 A2 | 11/2011 | |
| EP | 2 562 060 A1 | 2/2013 | |
| FR | 2 893 171 A1 | 5/2007 | |
| WO | WO-2013011258 A1 * | 1/2013 | ............ B60Q 1/442 |

OTHER PUBLICATIONS

European Search Report dated Jul. 7, 2015 corresponding to European Patent Application No. 15154287.5.
"Transport information and control systems—Adaptive Cruise Control systems—Performance requirements and test procedures" International Standard ISO 15622, Oct. 15, 2002 (32 pages).

* cited by examiner

METHOD AND SYSTEM FOR PREDICTIVE DRIVER ASSISTANCE USING COMMUNICATION AND VEHICLE EQUIPPED WITH SUCH SYSTEM

BACKGROUND

Field

The present invention relates to the field of automated computerized driver assistance for a host vehicle. The invention regards in particular a method and a corresponding program for performing communication to other traffic objects of a driver assistance actuation of the host vehicle to other traffic objects. The invention particularly regards a method for communicating a determined behavior to other traffic objects using light signals or car-to-x-communication. The invention further includes the vehicle equipped with such a system and the system itself.

Description of the Related Art

Today a plurality of driver assistance systems for vehicles is available which provide an increased driving comfort and improved safety for the passengers of a vehicle. Functions implemented by the driver assistance systems range from distance sensing and parking assistance to sophisticated Advanced Driver Assistance Systems (ADAS) such as, for example, cruise-control functions, for example "Adaptive Cruise Control" (ACC) described in ISO-Norm 15622:2010 and "Intelligent Adaptive Cruise Control" (IACC), which may include a lane change assistance functions, collision mitigation functions, emergency braking functions, etc.

Functions related to ADAS may include a detection of other objects moving in front or behind a vehicle (ego-vehicle) employing ADAS using sensor data acquired by various sensor equipment such as radar (radio detection and ranging) and camera(s), etc., and may include functions for predicting a future behavior of the other moving objects, e.g. with respect to a potential lane change of a vehicle detected ahead of the ego-vehicle. Data containing information can also be acquired using car-to-x-communication. Moving objects, and in particular other vehicles in the traffic environment of relevance to the ego-vehicle or host vehicle are "targets" for predicting their future behavior by means of a prediction system and are therefore often referenced as target objects or target vehicles. Furthermore it is generally demanded for assistance functions relying on predictions to operate with high reliability, which includes avoiding situations that may let the driver feel uncomfortable or that may even require intervention of the driver in order to avert a possible danger.

US 2010/0228419 A1 describes a technique for risk assessment in an autonomous vehicle control system. Each of a plurality of objects detected proximate to a vehicle is monitored by various sensor equipment such as long- and short-range radar and a front camera. Sensor data of the sensors is fused and, based on the fused sensor data, object locations are predicted relative to a projected trajectory of the vehicle. A collision risk level between the vehicle and each of the monitored objects during a lane-change maneuver is assessed with respect to potential actions of the monitored objects such as continuing with a fixed velocity, mild braking, or hard braking. A lane change maneuver is controlled according to the assessment and risk tolerance rules specifying spatial safety margins.

EP 2 562 060 A1 describes a technique in an ego-vehicle for predicting a movement behavior of a target traffic object with exemplary emphasis on target objects cutting-in to a lane of the ego-vehicle or cutting-out from the lane of the ego-vehicle. The technique is based on two prediction subsystems, wherein a context based prediction (CBP) is related to recognition of a movement behavior before the behavior can be observed, i.e. a determination of what will happen, while a physical prediction (PP) is related to a determination of how a behavior will or may happen. The context based prediction relies on at least indirect indicators, while the physical prediction relies on direct indicators. Direct and indirect indicators or indicator combinations are derived from acquired sensor data.

However employing predictive ADAS may determine a behavior and lead to an action of the ego-vehicle which is not necessarily understood by other objects such as vehicles in the traffic environment of the ego-vehicle. Under conditions of restricted visibility due to dawn, dusk, darkness, fog or else, actions of the ego-vehicle may be indiscernible for other traffic participants or only comprehended with a time delay. Particularly actions such as mild braking of the ego-vehicle are difficult to detect by a driver of another vehicle. It takes for example often quite a while until a driver of a target vehicle recognizes a mild braking from what he sees in the mirror. When a target vehicle does not recognizes mild braking applied by the ego-vehicle early, the mild braking being intended to maintain a gap for a cut-in to the front of the ego-vehicle, the target vehicle might miss the chance to cut into the lane of the ego-vehicle and therefore the target vehicle misses to use a gap provided by the ego-vehicle. The general traffic flow will be affected adversely by the misunderstanding between ego-vehicle and target vehicle.

In case of the ego-vehicle following a target vehicle with a constant gap, but intending to overtake the target vehicle, it is difficult to indicate the ego-vehicle's determined behavior overtake to the target vehicle and to simultaneously comply with legal restrictions, for example with respect to maintain a minimum safety distance or permission of light usage.

On the other hand using light signals sent from the ego-vehicle to communicate a driver's operation to other vehicles is mentioned in the related art.

The usage of side turning lights manually activated by the driver is in common to contemporary vehicles such as motorcycles, cars, trucks etc.

Automatic activation of light signals to communicate a future driver behavior by means of projecting a specific light pattern on the road surface is for example disclosed in DE102011081394B3 and DE102006050546A1. These approaches are not suited for the above stated problems, because the commonly used road surface ahead of the ego vehicle is usually not visible to the drivers of preceding vehicles.

DE 100 05 499 A1 discloses to vary the light emitting area of brake lights of the ego-vehicle in dependence on brake system pressure of the vehicle in order to convey an additional information to a successor vehicle of the ego-vehicle.

DE 21 2006 000 065 U1 shows to vary the position and the light emitting surface of brake lights of the ego-vehicle in order to imitate the effects of an approaching (decelerating) or departing (accelerating) car to a respectively succeeding vehicle.

However DE 100 05 499 A1 and DE 100 05 499 A1 explicitly disclose determining the actual behavior of the ego-vehicle or determining a driver executed action such as operating a brake pedal, and exclusively and invariably address the traffic situated to the rear of the ego-vehicle.

FIG. 1 depicts a traffic situation on a segment of a road 1 with three parallel lanes. The road 1 comprises a left lane 1, a center lane c and a right lane r, all three lanes are destined for traffic into the same direction. The left part of FIG. 1 shows the traffic situation for a point in time $t_0$ and the right portion of FIG. 1 shows the traffic situation for a point in time $t_1$ with $t_1 > t_0$.

At $t_0$ an ego-vehicle 2 equipped with an ADAS system travels on the left lane 1 with a velocity $v_{E1}$ 3. On the center lane c and in front of a driving direction of the ego-vehicle 2 a vehicle A 4 and a further vehicle B 6 travel with a respective velocity $v_A$ 5 for the vehicle 4 and velocity $v_B$ 7 the vehicle B 6. Vehicle A 4 drives behind vehicle B 6 and will approach vehicle B due to its velocity $v_A$ 5 being larger than $v_B$ 7. The ego-vehicle 2 travels with a velocity $v_{E1}$ 3 with $v_{E1}$ 3 $> V_A$ 5 and $v_{E1}$ 3 $> v_B$ 7.

The ADAS system of the ego-vehicle 2 will predict at a point in time $t_0$ that vehicle A 4 might execute a cut-in maneuver 8 in order to avoid a collision with the slower vehicle B 6 traveling in front of vehicle A 4 on the center lane c. In order to enable vehicle A 4 to change from the center lane c to the left lane 1, the ADAS of ego-vehicle 2 will start applying a mild braking actuation and thereby generate a suitably fitting left gap for vehicle A 4.

At $t_1 > t_0$ the ego-vehicle 2 drives with a velocity $v_{E2}$ 3, with $v_{E2} < v_{E1}$ due to applying a mild brake at a time t with $t_0 < t \le t_1$. At $t_1$ the ego-vehicle 2 drives with a velocity $v_{E2} \approx v_A$ 5. However, as the ego-vehicle 2 only executes mild braking for adapting its velocity $v_E$ to the velocity $v_A$ of the vehicle A 4, especially at night the vehicle A 4 or the driver of vehicle A 4 might not recognize that the gap to the left of the vehicle A 4 is maintained and therefore does not execute the cut-in maneuver 8 as predicted by the ADAS system of the ego-vehicle 2 in time $t_0$, but instead continues its straight course 10 on the lane c towards vehicle B 6 and thereby shortening the distance to the slower vehicle B 6.

The consequence of vehicle A 4 not recognizing the executed actuation of the ego-vehicle 2 in the depicted traffic scene in FIG. 1, may be the vehicle A 2 applying a strong braking in order to avoid a collision with vehicle B 6, or even a dangerously late lane change to the left lane 1 when recognizing with a time delay that a lane change to the left lane 1 is indeed possible due to the ego-vehicle 2 having reduced its velocity to $v_{E2}$. In the traffic situation shown in FIG. 1, the capabilities of the ADAS system in the ego-vehicle 2 are not used to the extent which would be possible and desirable. The traffic flow is badly affected and even a dangerous situation may evolve.

FIG. 2 depicts a different situation. At $t_0$ an ego-vehicle 2 equipped with an ADAS system travels on the left lane 1 with a velocity $v_{E1}$ 3. On the left lane 1 in front in a driving direction of the ego-vehicle 2 travels a vehicle A 4 with a velocity $v_A$ 5. On the center lane c travels a vehicle B 6 with a respective velocity $v_B$ 7. The vehicle A 5 is situated in front of the vehicle B 6.

At $t_0$ the ADAS of the ego-vehicle 2 predicts that vehicle A 4 could execute a cut-out maneuver 11 to the center lane c, as an overtaking maneuver of vehicle A 4 with respect to the slower vehicle B 6 traveling in front of vehicle A 4 on the center lane c is almost finished. However a distance between vehicle A 4 and the ego-vehicle 2 is small and for example already corresponds to a minimal allowed gap setting 12.

As the ego-vehicle 2 follows vehicle A 4 with a constant speed $v_E$ and constant distance corresponding to a minimal allowed gap setting 12, vehicle A 4 will not recognize an intended behavior of the ego-vehicle 2 to overtake the vehicle A. Accordingly, the vehicle A 4 will not perform the cut-out maneuver 11 as predicted by the ADAS system of the ego-vehicle 2, but continue its straight course 10 on lane c towards vehicle B 6 as shown in FIG. 2 at a time $t_1 > t_0$ instead.

The fact that vehicle A 4 does not recognize the intended behavior of the ego-vehicle 2 early results in a disadvantageous blocking of the ego-vehicle 2 on the left lane 1 and therefore an obstructed traffic flow in the situation depicted in FIG. 2. Hence in the traffic scene shown in FIG. 2, the capabilities of the ADAS system in the ego-vehicle 2 are again not used to the extent which would be possible and desirable to improve an overall traffic flow.

Therefore the technical problem of avoiding the shortcomings of the adaptive driver assistance systems according to the prior art when executing an intended course of action is to be addressed.

SUMMARY

The method according to the invention for communicating an ego vehicle's determined behavior to a target object (or its driver) for use in a driver assistance system of a vehicle addresses the above cited problem. The method comprises steps of acquiring data of a traffic scene in an environment of the vehicle, of calculating a prediction result including the target object's behaviour based on the acquired data, of determining an action to be performed by the host vehicle based on the prediction result and optionally generating an actuation signal for performing the determined action. The method further determines communication information based on the determined action, wherein the communication information indicates the determined action, and outputs the communication information to a communication means for communication to the target object via at least one of a lighting means of the vehicle and a car-to-x communication means to the target object.

The claimed method provides the effect, that by generating an information conveying the determined action which is thereafter to be performed and by communicating the determined action of the driver assistance system to at least one target object (or its driver), the target object (or its driver) is enabled to perceive an action of the ego-vehicle and to act earlier and more reliable taking account of the initiated actuation of the ego-vehicle, especially in situations of bad visibility. In the following reference is made to the target object in relation to recognizing the information indicative of the future behavior of the ego vehicle. This could be performed by an ADAS of the target vehicle or its driver in any case.

The method comprises in an advantageous embodiment in the step of outputting the communication information, outputting information about the determined action via the lighting means of the vehicle by modulating or varying at least one of a light intensity, a light color, a light emitting area, a light emitting position and an illumination direction of the lighting means.

The technical solution of conveying information about the determined action, which is determined by the driver assistance system of the ego-vehicle, is preferably communicated to one or more target vehicles by the lighting means of the ego-vehicle, which are available for immediately transmitting the communication information in addition to their usual function and particularly suitable to transmit the communication information on the ego-vehicle's determined behavior in an intuitive manner visible even under conditions of low visibility. The information on the determined action is to be communicated by modulating at least one lighting parameter of the at least one lighting means, for example varying an intensity of the light emitted by the lighting means. The modulation of the intensity of the light may include varying the light intensity around an average light intensity. The modulation of the light intensity may also include switching on or switching off (additional) lighting means instead or in addition to varying a light intensity in a linear or a on linear manner over time.

Light intensity can be understood as a luminous intensity measuring a power weighted by a wavelength emitted by a light source in a particular direction per unit solid angle measured in cd (candela). Modulating luminance leads to a modulated brightness as an attribute of visual perception in which a light source appears to be radiating or reflecting light. Brightness is to be understood as the perception elicited by the luminance of a lighting means. The lighting means accordingly varies a property of the lighting means which is observable by one or more target objects.

Instead of or in addition to modulating the light intensity of the lighting means, a light color of the light emitted may be varied. A modulation of the light color may be performed within the framework of the applicable road traffic regulations which specify the color of the emitted light of a vehicle for the respective directions of the emitted light with respect to a vehicle longitudinal axis. The applicable road regulation may comprise traffic laws governing the general requirement for lighting means and emitted light of a vehicle on one hand and informal rules that for example have developed over time. The applicable road regulations may be general regulations as well as regional or local traffic regulations.

Instead of or in addition to modulating the light intensity of the lighting means, the lighting direction of the lighting means may be varied. The lighting direction of the lighting means can be understood to be an axis of a light radiated by the lighting means. By varying the lighting direction a similar effect as a modulation of the light intensity is achieved.

Instead of or in addition to modulating the light intensity of the lighting means a light emitting position and an active light emitting area of the lighting means may be modulated. In this embodiment the lighting means includes a light emitting area. Either the whole light emitting area or a part of the light emitting area may emit light and constitutes the active light emitting area of the lighting means. The lighting means may accordingly vary at least one of a size of an active light emitting area, a shape or other visual appearance of the active light emitting area, a position of the active light emitting area on the entire light emitting area of the lighting means for communicating an ego-vehicle's intention (determined behavior).

A preferred embodiment of the method is characterized in that the lighting means of the vehicle includes at least one of side turn signals, sequential turn signals, position lamps, a headlamp and brake lights, daytime running lamps, driving lamps and cornering lamps. The lighting means of the ego-vehicle used for communicating the ego-vehicles determined behavior may include any of the elements of a lighting system of the respective vehicle consisting of the plurality of lighting and signalling devices mounted on or integrated to the various parts of the vehicle. These may include the front, sides, rear and top of the vehicle. The lighting means for the vehicle enables operating the vehicle under low visibility and increases the conspicuity of the vehicle to other traffic participants. By using the lighting means of the invention to be one or more of the lighting and signalling elements of the lighting system of the vehicle, the functionality of the lighting means is increased and no specific signalling device for communicating an ego-vehicles determined behavior becomes necessary.

The communication information includes information on the determined action, which defines "what" (content) is to be communicated to the other objects in the environment and a signalling pattern which specifies "how" (message) the determined action is to be communicated to the target objects. The signalling pattern may be one of a plurality of predefined signalling patterns taking account of the regional compulsory and informal conventions of using the elements of the lighting system of the vehicle. The signalling pattern may be selected in one embodiment in dependence on sensor information comprising information on the ego-vehicle's position, such as regional jurisdiction having specific rules on lighting means of a vehicle with respect to layout and arrangement of the lighting elements and usage of the lighting elements, or the actual situating of a traffic scene, for example within a built-up area or in a rural area. Therefore for the same information on an action of the geo-vehicle a regionally adapted signalling pattern may be selected. The signalling pattern may further be selected according to relative positioning with respect to the ego-vehicle of the target object to be the intended recipient of the information on the intended action of the go-vehicle.

Preferably the method comprises the predetermined signalling pattern including at least one of a head light flashing with a short duration for signalling a possibility for a cut-in, a head light flashing with a long duration or a high elevation illumination beam axis for signalling a danger of cutting in or a desire to overtake, using side turn signals for signalling of a lane change in order to give way to another vehicle (target vehicle), which is for example approaching from the back.

In a further advantageous embodiment the method comprises the predetermined signalling pattern including modulating the lighting means in at least one of a light emitting surface area, light emitting surface position and a light intensity to imitate the visual effect of the vehicle either approaching to or moving away from the target object. By imitating the effect of an approaching or departing vehicle, an intuitively understandable information on the respective actuation of the ego-vehicle is communicated to the at least one target vehicle to the front or backwards of the ego-vehicle.

The method according to a preferred embodiment is implemented in a driver assistance system configured to assist a driver in particular in a lane change situation. Especially subsystems such as lane change assistants or automated cruise control benefit from communicating an ego-vehicle's determined behavior to other traffic objects.

In a preferred embodiment the prediction result includes information on a predicted future movement behaviour of the target object.

The technical problem is solved by a system for communicating an ego-vehicles determined behavior to a target object for use in a driver assistance system for a vehicle, the system comprising means configured to acquire data of a traffic situation in an environment of the vehicle, a prediction means configured to calculate a prediction result comprising information on a target object's behaviour based on the acquired data, an action determination means configured to determine an action based on the prediction result and to optionally generate an actuation signal based on the determined action, and the system is characterized in further comprising a communication means configured to determine a communication information based on the determined action, wherein the communication information indicates the determined action, and to output the communication information to at least one of a lighting means and a car-to-x communication means for communication to the target object.

The technical problem is solved by the vehicle including the system for communicating an ego-vehicles determined behavior to a target object for a driver assistance system.

The technical problem is further solved by a computer program with program-code means for executing the method steps according to an embodiment of the invention when the program is executed on a computer or digital signal processor. The computer program may form a subprogram or program module of in a ADAS system.

The technical problem is advantageously solved by furnishing a vehicle with the system for communicating an ego-vehicle's determined behavior to a target object. The vehicle may be a road vehicle equipped with a driver assistance system and communicating an ego-vehicle's determined behavior to a target object. The target object may be a traffic participant such as a pedestrian, a cyclist or another self propelled vehicle such as a motorcycle, a car or a truck. The vehicle (ego-vehicle) may be any one of a land vehicle, sea vehicle or air vehicle, either operating fully or semi-autonomous or driver operated vehicle with a driver assistance system.

BRIEF DESCRIPTION OF THE DRAWINGS

The inventive method and system are explained in more detail with reference to the attached figures, wherein.

Components having the same numerals in the figures denote the same components.

DETAILED DESCRIPTION

The method according to the invention is performed on or by an ego-vehicle or a respective computing system on board of the ego-vehicle being equipped with one or more sensor means. As displayed in FIG. 3, the ego-vehicle 2, also referred to as host vehicle or vehicle 2 hereinafter, is equipped with schematically indicated sensor equipment ii and an Electronic Control Unit (ECU), wherein the latter may be realized in form of one or more hardware units on board of the ego-vehicle 2, onto which firmware and/or software is installed to implement one or more driving assistants to assist a driver of the ego-vehicle 2.

Figure 1:
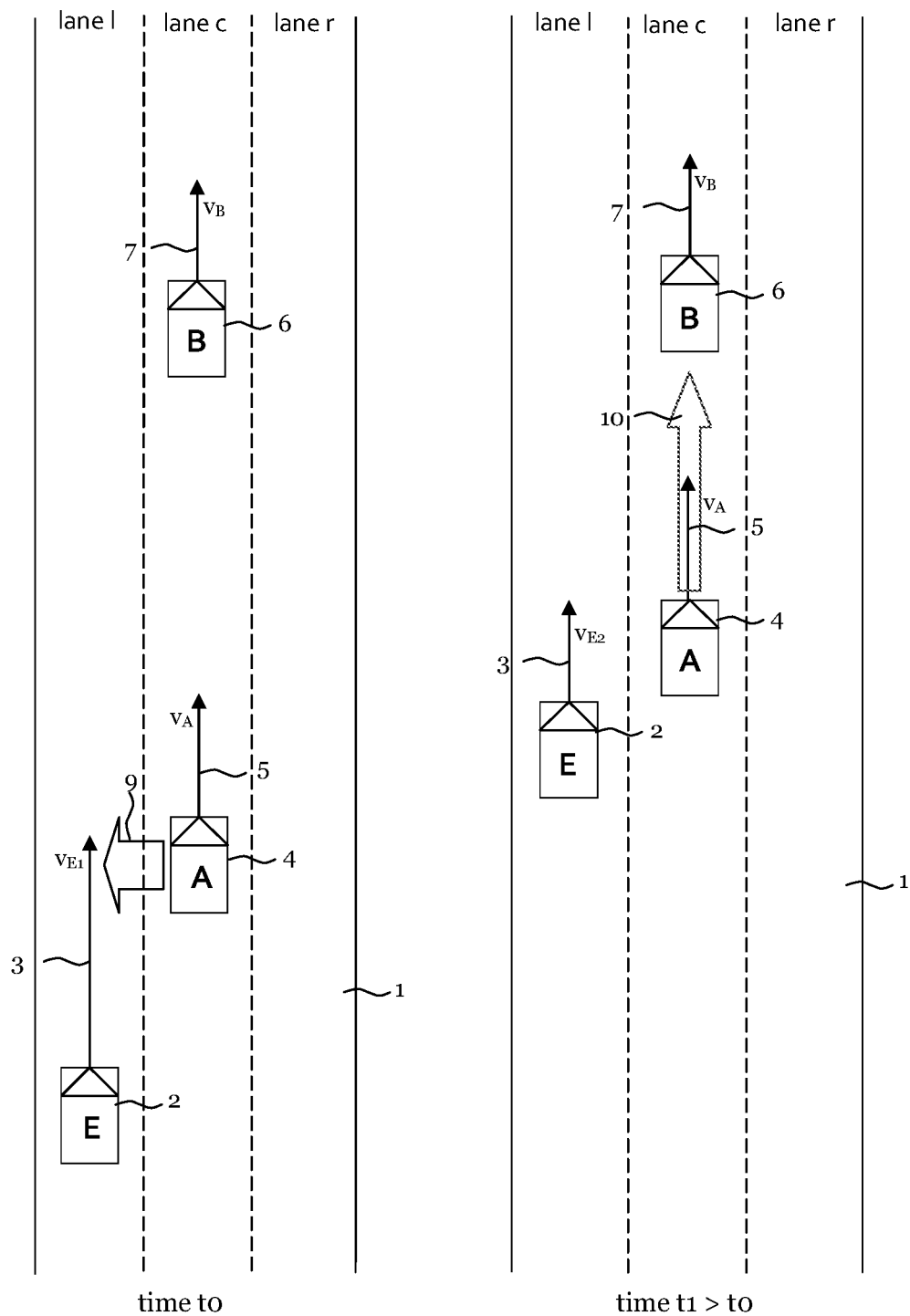
FIG. 1 shows an exemplary traffic situation on a road segment with plural lanes.
Figure 2:
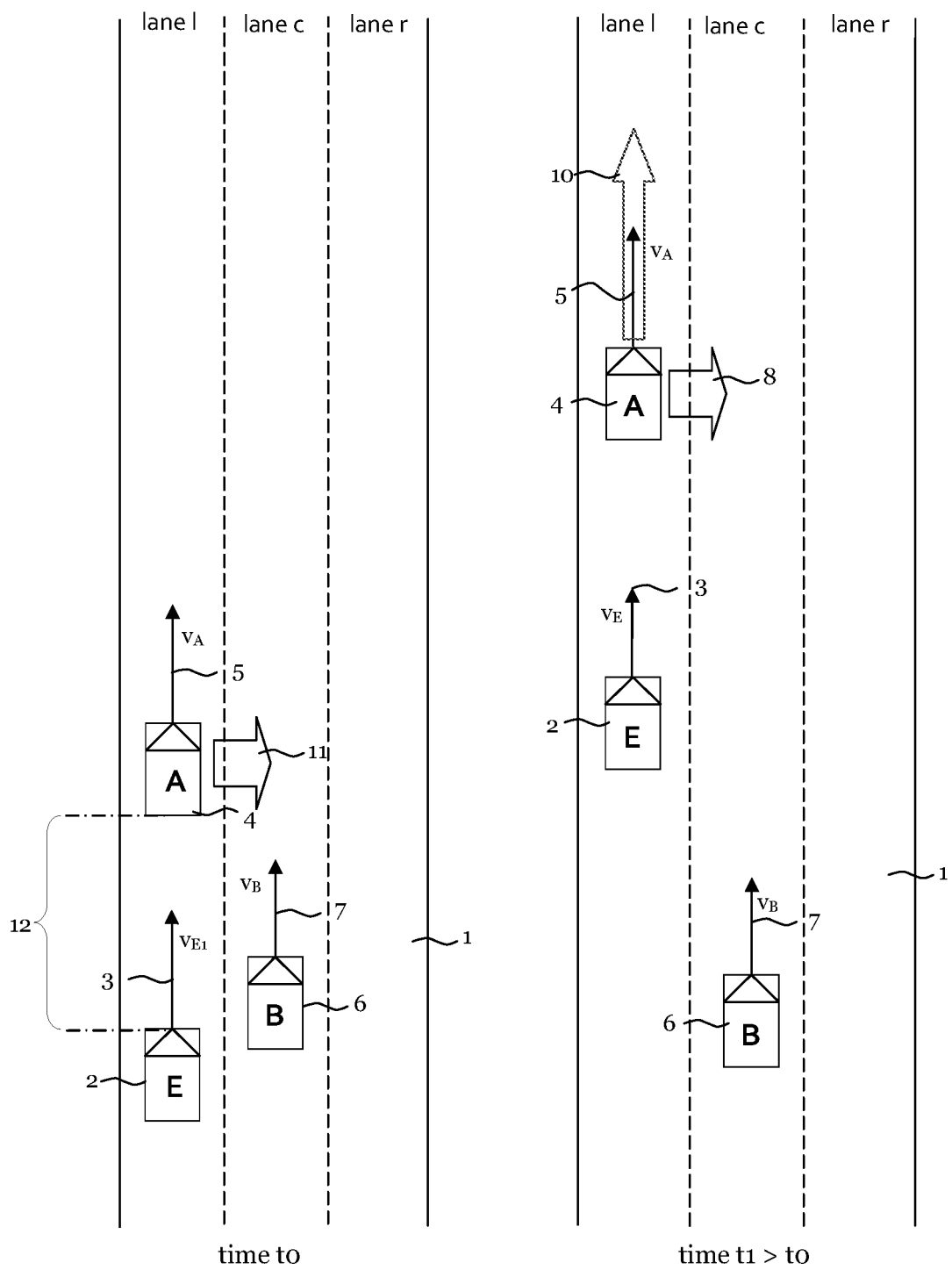
FIG. 2 shows a further exemplary traffic situation on a road segment with plural lanes.

It is assumed for purposes of discussing exemplary aspects of the invention below that on the ECU at least one ADAS function is implemented, such as a version of an IACC or another cruise control function, the operation of which includes a prediction of the further evolution of a traffic scene or parts thereof as shown in FIG. 1 or FIG. 2 in the future, including a prediction of the further behavior of vehicle A 4 and vehicle B 6.

Figure 3:
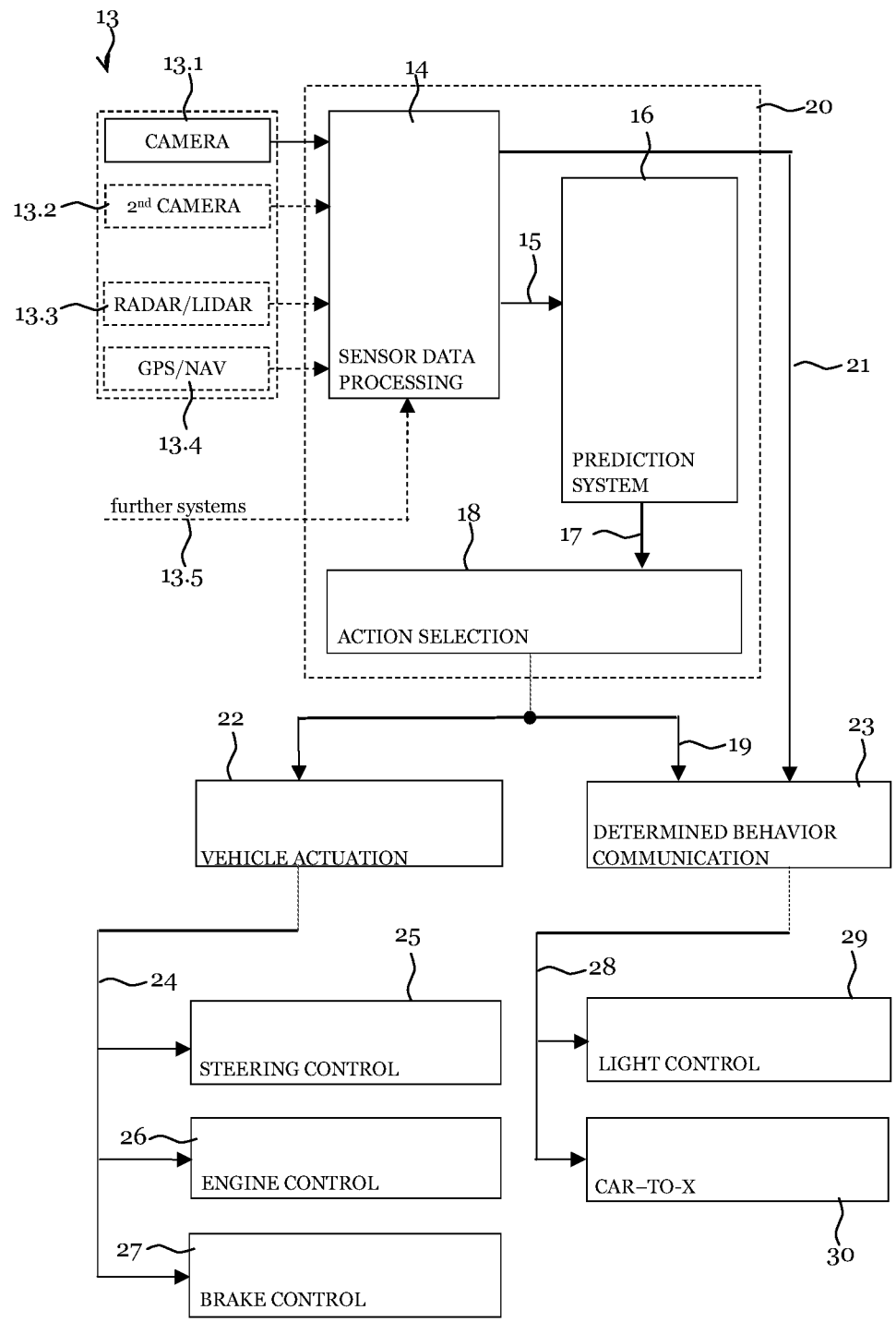
FIG. 3 is a diagram depicting an ADAS according to an embodiment of the invention.

FIG. 3 illustrates functional components of the ECU. As a specific example, the functional components described and discussed below may be associated to a cruise control module implementing one or more IACC functionalities on the ECU.

Data from sensor equipment 13 is acquired by a sensor data processing unit 14. More specifically, the sensor equipment 13 may comprise one or more radar transceivers 13.3, one or more lidar transceivers 13.3, one or more cameras 13.1, 13.2, a global navigation satellite system receiver (GNSS) 13.4, etc. Other sensors not shown which nevertheless may alternatively or additionally provide sensor data are acoustic sensors such as ultrasonic sensors. It is noted that for the following description the term sensor data is to be understood as including data received by the driver assistance system via further systems, e.g., direct car-to-car communication or car-to-infrastructure communication to stationary transceiver stations covering the drivable space, information provided via wireless or mobile communication, for example from a traffic information system, etc. Sensor data may also comprise data on the ego's vehicle's state which may be acquired by the sensor data processing unit 12 via a CAN-bus interface (Control Area Network), for example.

The sensor data processing unit 14 may implement functions as preprocessing of acquired sensor data and providing the preprocessed sensor data to the other components of an ACC system. The preprocessed sensor data describe a current traffic in the environment of the ego-vehicle 2 as detected by the components of the sensor equipment 13, and forms the basis for predicting a future traffic situation, as discussed in the following. The preprocessed sensor data from sensor equipment 13 is transmitted to a prediction system unit 16 which operates to calculate predictions based on the preprocessed sensor data. A prediction result signal 17 representing information related to the calculated prediction result is provided to the action selection unit 18.

The prediction result signal 17 is provided to the action selection means 18.

If an active control of the ego-vehicle 2 is required, the action selection means 18 operates to generate a corresponding control signal 19 which is provided to a vehicle actuation control means 22.

The vehicle actuation control means 22 controls one or more components related to control of specific functions of vehicle 2. FIG. 3 exemplarily illustrates components adapted for braking control 25, engine control 26 and steering control 27. Other or further functions may include providing warning indications, alerts, etc. to other systems and to the driver of the ego-vehicle 2.

As an output of the prediction system 16, the prediction result 17 may comprise a set of potential behaviors with probability values associated to each of the potential behaviors. The probability values may be understood as indicating a probability for a target vehicle 4, 6 to perform the associated potential behavior (potential movement behavior). The determination of the control signal 19 may then be based on at least one of the probability values of the prediction result.

The control signal 19 may indicate at least one of acceleration, deceleration, a braking action, and a steering angle setting of the ego-vehicle 2. Additionally or alternatively, the control signal 19 may indicate a control of equipment of the ego-vehicle 2 and may indicate, for example, switching on or off a motor, or a signal or light of the ego-vehicle 2, such as a turning signal light, braking light and a warning signal, and of actuating emergency equipment such as airbags.

According to embodiments of the method, the control signal 19 indicates one control value taken from a range of values associated with a particular operation of the vehicle. In one embodiment, the control signal 19 may set a maximum or minimum value of the range of values. According to one embodiment, a predefined limiting value, for example related to a maximum braking or accelerating action available for active control initiated by the driving assistant, e.g. for adaptive cruise control, is modified by the control signal 19 and is set to an increased or reduced control value. Further or other assistance systems arranged for receiving the control signal 19 may then operate within the limit or limits indicated by the control signal 19.

The prediction system 16 may comprise a module or subsystem for generating Physical Predictions (PP) and a module or subsystem for generating Context Based Predictions (CBP). The sensor data accepted from sensor equipment 13 is provided to an intermediate data processing layer which may comprise a component for providing direct indicators, and a component for providing indirect indicators. The direct indicators serve as a data basis for both the PP subsystem and CBP subsystem, while the indirect indicators serve as a data basis for the CBP subsystem only.

Direct indicators comprise observable variables, which are observable if and only if the behavior to be detected has started. For example, for predicting a lane-change, a set of direct indicators may comprise one or more of a lateral velocity, a lateral position relative to the lane, a changing orientation relative to the lane, and a changing orientation relative to other traffic participants.

Indirect indicators comprise observable variables, which are already observable before the predicted behavior has started. Indirect indicators may be defined as a set of indicators excluding direct indicators. For example, indirect indicators may relate to information about a relation between at least one traffic participant and one or more other traffic participants or static scene elements, such as an indicator indicating whether or not a fitting gap is available on a lane neighboring to the ego-vehicle 2.

Other indirect indicators may relate to information about an ego-vehicle's determined behavior, which may actively be communicated by the traffic participant whose behavior is to be predicted. Examples are intentions presumably indicated with a turning-signal, a brake-light, or information received via car-to-car-communication.

A set of potential trajectories is computed for a target vehicle 4, 6. By using the predicted movement behaviors from CBP, the set of relevant potential trajectories may be reduced. Matching a situation model against the history of perceived positional data in PP may help to further reduce the relevant potential trajectories.

More specifically, for predicting a target vehicle's 4, 6 future positions, in a first step, the probability for the target vehicle 4, 6 to perform one of a set of possible movement behaviors is estimated by the CBP. Some or all of these movement behaviors are validated by means of a PP. The purpose of the physical prediction is twofold: First, it validates the set of potential trajectories against a combination of the results of the CBP, the physical evidence, and vehicle relations. Second, it estimates the future position of each vehicle. Finally a mismatch detection step analyzes the consistency of the PP and the CBP. In case of mismatch, a fallback to the PP can be performed.

The context based prediction, physical prediction, and mismatch detection can be encapsulated in situation specific models and may be performed by different hardware units within the driver assistance system. Suited models fitting to the vehicle's environment can be activated or deactivated based on environment perception or self-localization.

While predictions serve generally well as a basis for decisions in advanced driver assistance systems, there are problems to be addressed.

Generally, sensor data is prone to errors such as misdetection, late detections, and wrong detections, which in turn may lead to less reliable predictions. Providing additional and further sensor equipment 13 may serve to improve the available data basis, but at increasing costs and hardware complexity.

Problems may also result from wrong predictions. Active control performed based on a wrong prediction may need to be stopped and reversed when the target vehicle 4, 6 shows an unpredicted behavior or a behavior which has been predicted with an inappropriately low probability. The resultant control may seem inappropriate, confusing and not comfortable to the driver and/or other traffic participants. The assistance system described in EP 2 562 060 A1 intends to minimize wrong predictions as far as possible by means of the introduction of situation models and a mismatch detection.

However, the diversity of drivers and their individual assessment of a traffic situation lead to different behaviors in ambiguous traffic situations. Whereas some drivers might change lane despite a small available gap, other drivers in the same situation will stay in their lane. This ambiguity can hardly be resolved by any prediction system, but the ambiguity can be represented e.g. by a distribution of probability values over different behaviors. The Further details of the operation of the prediction calculation system 14 including the PP and CBP subsystems can be as described in EP 2 562 060 A1, see for example FIG. 6 and the corresponding sections of the description thereof, which are incorporated by reference for illustrating the layout of the method of for computationally predicting future movement behaviors of target objects.

While for exemplary reasons systems with two predictive subsystems PP, CBP are mentioned above, it has to be noted that other embodiments of a driving assistance system may comprise three or more separate prediction subsystems or modules. Accordingly, a combination calculation then has to combine three or more predictions. As an example, for a system comprising three prediction subsystems, a combination rule implemented in a prediction combination subsystem of the prediction system 14 may comprise a rule such as "brake hard if module 1 is active AND module 2 is active AND module 3 is INACTIVE." As another example, for a system comprising at least four prediction subsystems, a combination rule may be represented as "Brake only hard if at least 4 modules are active". Instead of indicators such as "active" or "inactive", any other indicators could additionally or alternatively be used.

The first and second prediction subsystems are different from each other, i.e. are not identical to each other, which is to be understood such that a different prediction technique, approach, scheme, and/or procedure may be applied, including that there is at least one difference in the processing, the steps to be performed, etc. The first and second prediction subsystems may be different from each other in the sense that each subsystem operates to provide a prediction of a behavior of a detected object independent of the prediction provided by the other subsystem. According to other embodiments, one of the prediction subsystems receives an output of the other subsystem as an input.

The first and second prediction subsystems may calculate the respective prediction results based on the same data set or on a different data set, such that the data sets differ in at least one data item. As an example, the prediction results calculated by the subsystems may rely on different sets of sensor data 15 as provided by the sensor data processing means 14.

The subsystems may rely on one and the same data set, onto which different prediction techniques are applied. According to other embodiments, different data sets with respect to the detected environment of the host-vehicle are used, such that the data sets differ in which of the detected moving or still objects are considered for the predictions.

With regard to the driver assistance system, the subsystems may differ in the set of indicators relied upon. In that system, the context based prediction subsystem CBP relies at least on indirect indicators, while the physical prediction subsystem PP relies only on direct indicators. As a specific example, the set of objects relied upon by the context based prediction subsystem may include the target object, the ego-vehicle and further moving objects ahead or behind the target object 4, 6 and/or ego-vehicle 2 in order to provide a prediction whether the target object 4, 6 is about to perform a lane-change. In contrast, the physical prediction subsystem only relies on data sensed with respect to the target object to provide a prediction of a lane change.

The combination of the first and second predictions may comprise any kind of calculation or operation such as at least one of a summation and a multiplication of representations of the predictions, and may comprise complex operations such as a concatenation of simple operations to generate the prediction result 17.

Figure 4:
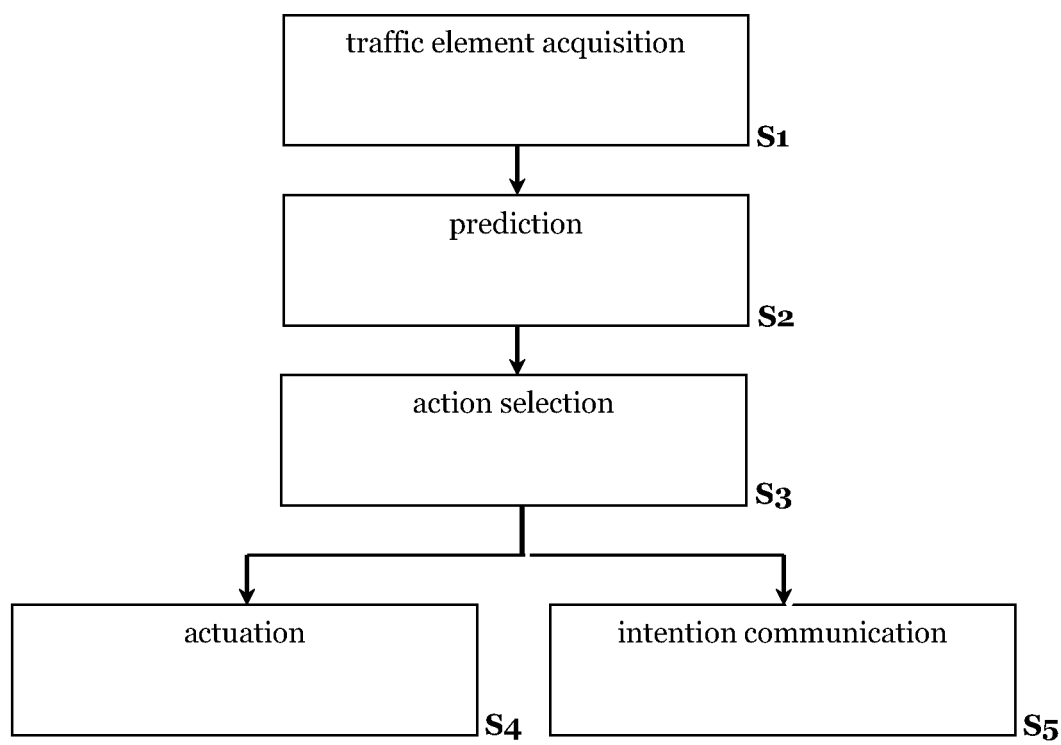
FIG. 4 is a flowchart depicting an embodiment of the inventive method.

FIG. 4 illustrates the processing sequence of an embodiment in terms of method steps in a flowchart.

In a step S1 the ADAS system acquires the traffic elements constituting the traffic scene. This in particular includes obtaining the sensor data from the sensor means 13. The sensor data may include data on the ego-vehicles 2 position, velocity, acceleration, heading etc. The sensor means 13 further acquires information on the environment of the ego-vehicle 2, this may include data on the infrastructure such as the road 1, other objects, such as other vehicles 4, 6, for example.

In a step S2 the future position, velocity heading, acceleration of one or more other traffic participants, hereinafter referred to as target vehicles 4, 6, is predicted.

The calculation of the prediction result to be output by the prediction step S2 may be performed in a two step approach. In a first substep, for each target object 4, 6, the probability for each target vehicle 4, 6 to perform one of a set of possible movement behaviors is estimated by a context based prediction.

Subsequently, some or all of these estimated movement behaviors are validated by means of a physical prediction.

In a final substep, a mismatch detection analyzes the consistency of the physical prediction and the context based prediction.

The context based prediction, physical prediction, and mismatch detection can be encapsulated in situation specific models and can be performed by different hardware units within the driver assistance system 16. Suited models fitting to the vehicle's environment can be activated or deactivated based on environment perception or self localization. One possible method for calculating the prediction result is shown in EP 2 562 060 A1, for example in FIG. 6.

The prediction result calculated instep S2 forms the basis for selecting a suitable action in the subsequent step S3. Selecting (determining) an action may in one case simply involve continuing the present course of action for the ego-vehicle 2 as the prediction result shows that a previous assessment of the situation is confirmed. On the other hand determining an action may involve generating an actuation signal 19 in step S3, which includes specific amended settings for steering control 25, brake control 26, or engine control 27 of the ego-vehicle 2 in order to take account of the predicted evolvement of the traffic situation.

In the subsequent step S4 the actuation signal 19 generated in the action selection step is executed to result in a specific actuation of the ego-vehicle 2 which takes account of the predicted traffic situation.

Simultaneously in a step S5 the determined action forms the basis for communicating the determined action to the target vehicle 4, 6 independent from actually being performed. Early starting of the communication of the information to the target vehicle 4, 6 in parallel to executing the actuation therefore enables the target vehicle to note the intended and determined action of the ego-vehicle 2 before visually taking account of the behavior of the ego-vehicle 2. On the other side critical situations may be avoided entirely if in ambiguous situations a determined action is communicated but not actually performed. For example if it cannot be predicted for sure that a target which cuts in closing the gap by acceleration might be communicated while in fact the host vehicle's current speed is maintained. Thus in case that the target vehicle will nevertheless cut in the situation is less critical.

Figure 5:
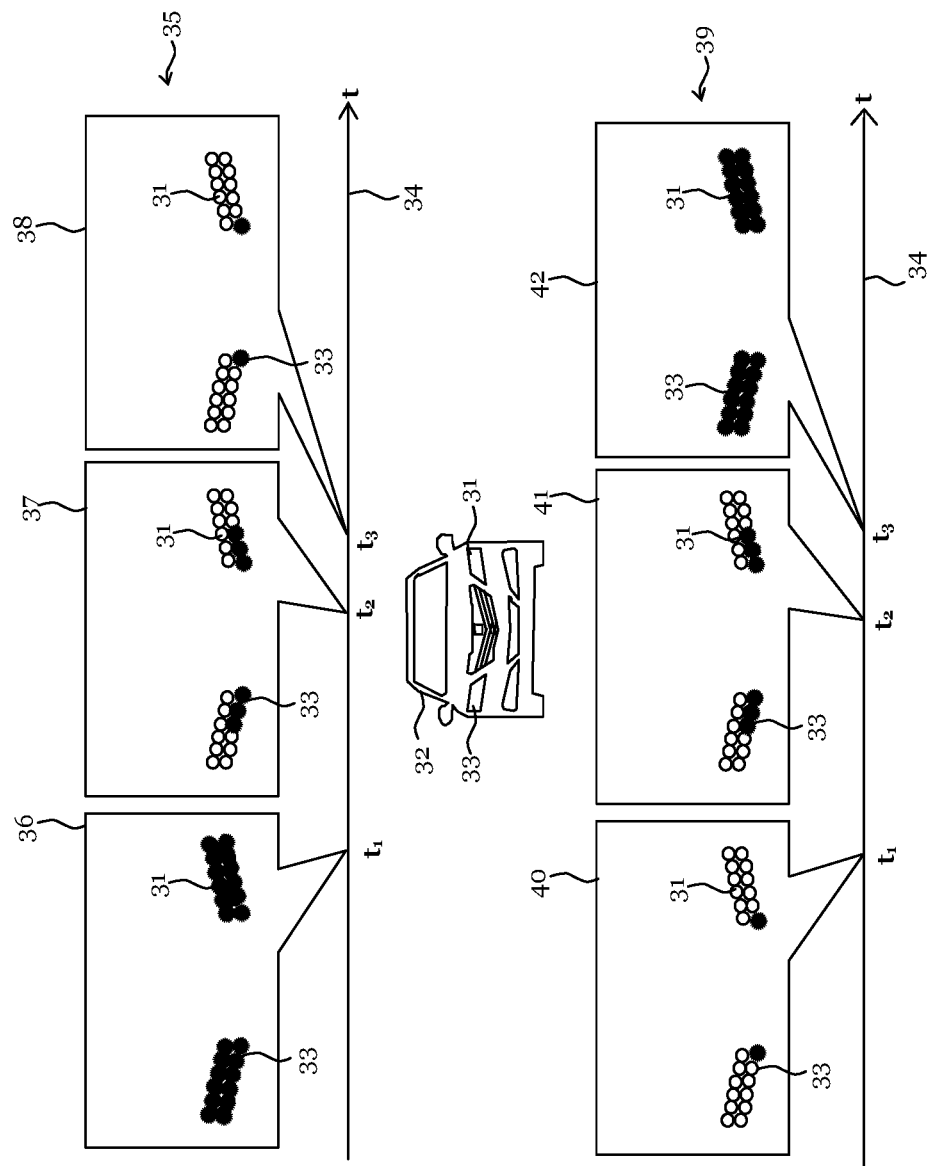
FIG. 5 shows headlight patterns of a car modulated according to an embodiment.

FIG. 5 depicts an embodiment of a communication via the lighting means of the vehicle 2. With respect to FIG. 5 it is particularly to be noted that the shown scheme provides one possibility out of a plurality of possibilities to communicate an ego-vehicle's determined behavior from the ego-vehicle 2 to a target object, for example a target vehicle 4. The displayed possibility of communication relies on the head lamps 31, 33 of the ego-vehicle 2 which is displayed in a front side view 28 in the centre of FIG. 5. Each of the headlamps 29, 30 may comprise two rows of individual light emitting elements, each row including six light emitting elements. In the upper portion of FIG. 5, a scheme for signalling a retreat of the ego-vehicle is displayed. A retreat of the ego-vehicle 2 is considered an actuation which is characterized by applying a "mild brake", for example to maintain a fitting left gap for a target vehicle 4 to change to the lane 1 in front of the ego-vehicle 2 in the traffic situation depicted in FIG. 1.

The retreat signalling scheme 35 in the upper portion of FIG. 5 is displayed over a time t. The time t is shown on the abscissa axis 33. The retreat scheme 35 starts at a time $t_1$ with all light emitting elements in the left head lamp 33 as well as in the right head lamp 31 to be illuminated and emitting light as shown in the light pattern 36. At a time $t_2$ later than $t_1$, a light pattern 37 is emitted by the headlamps 31, 33, The right headlamp 31 has only the light three innermost light emitting elements in the lower row emitting light. The left headlamp 33 has also only the three innermost light emitting elements in the lower row emitting light. At a time $t_3$ later than $t_2$, a light pattern 38 is emitted by the headlamps 31, 33. The right headlamp 33 has only a single innermost light emitting element in the lower row emitting light. The left headlamp 31 has also only a single innermost light emitting element in the lower row emitting light. The three light patterns 36, 37, 38 viewed in succession generate the impression of a retreating car to a viewer in front of the ego-vehicle 2. When the target vehicle 4 is situated to the front of the ego-vehicle 2 as shown in FIG. 1, a driver of the target vehicle 4 intuitively comes to the conclusion that the ego-vehicle 2 does not press forward and will conclude that a fitting left gap for changing lane to the ego-vehicle's lane will be available.

The communication of the retreat pattern has been described with a time sequence of three light emitting patterns on an array of 2×6 light emitting elements in each of two head lamps 31, 33. It is to be noted, that the same effect may be achieved by a sequence of more different patterns succeeding each other. Furthermore the retreat pattern is not necessarily achieved by light emitting elements either emitting light or not emitting light. The effect may be achieved by varying a light intensity of the individual light emitting elements, or by varying a light colour of the light emitting elements. Furthermore the variation may occur in a linear or in a non-linear manner over time.

It is to be noted further that the light characteristics of the headlamps 31, 33 may be modulated within bounds set by the applicable law under the jurisdiction and the specific circumstances such as day, dawn, night, low visibility etc. A respective selection may therefore be executed taking into account sensor data providing information on visibility, the target vehicle's 4 position relative to the ego-vehicle 2, the global position of the ego-vehicle 2 as determined by a GNSS sensor and the respectively admissible legal and physical bounds. The signalling information covering the respective situation may for example be stored in respective data sets in a storage means and recovered based on a demand issued by the determined behavior communication means 23.

The lower portion of FIG. 5 displays an example for an "approach"—signalling scheme 39 in a time t marked on the abscissa axis 33. The approach scheme 39 starts at a time $t_1$ with only a single innermost light emitting element in the lower row emitting light in a light emitting pattern 40. The left headlamp 31 has also only a single innermost light emitting element in the lower row emitting light. At a time $t_2$ later than $t_1$, a light pattern 41 is emitted by the headlamps 31, 33. The right headlamp 33 has only the light three innermost light emitting elements in the lower row emitting light. The left headlamp 31 has also only the three innermost light emitting elements in the lower row emitting light in the light emitting pattern 38. At a time $t_3$ later than $t_2$, a light pattern 42 is emitted by the headlamps 31, 33. The right headlamp 33 has all light emitting elements in the left head lamp 31 as well as in the right head lamp 33 illuminated and emitting light as shown by the light pattern 42. The three light patterns 40, 41, 42 viewed in succession generate the impression of an approaching car to a viewer in front of the ego-vehicle 2. When the target vehicle 4 is situated to the front of the ego-vehicle 2 as shown in FIG. 1 a driver of the target vehicle 4 intuitively comes to the conclusion that the ego-vehicle 2 does quickly approach and will conclude that an initially fitting left gap for changing lane to the ego-vehicle's lane will not be available.

The communication of the approach pattern has been described with a time sequence of three light emitting patterns on an array of 2×6 light emitting elements in each of two head lamps 31, 33. It is to be noted, that the same suitable effect is to be achieved by a sequence of more different patterns succeeding each other. The corresponding points as discussed before with respect to the retreat pattern apply for the approach pattern in the lower portion of FIG. 5.

Whereas the communication using lighting means such as head lamps 31, 33 of the ego-vehicle 2 are discussed with respect to FIG. 5, it is perfectly clear, that many other light signals could be used to achieve the same effect. For example a short flashing of the headlamps 31, 33 may signal from the ego-vehicle 2 to the target vehicle 4 that the ego-vehicle offers a possibility for the target vehicle to cut in by applying a mild brake. Correspondingly a short flashing of the headlamps 31, 33 may signal to the target vehicle 4 that the ego-vehicle does not intend to apply brakes and therefore a cut-in may lead to dangerous situation or that the ego-vehicle 2 intends to overtake the target vehicle 4.

The long and short flashing of the headlamps 31, 33 or any other lamps may also be implemented in an embodiment by varying the light emitting direction between a low beam and a high beam.

Instead of the headlamps 31, 33, turn signal lights of the ego-vehicle 2 may be used alternatively or additionally to communicate the intended and/or planned future action such as lane change from the ego-vehicle 2 to a target vehicle 4.

Whereas with respect to FIG. 5, the determined behavior communication means 23 is considered to communicate an ego-vehicle's determined behavior from the ego-vehicle 2 to the target vehicle 4 via lighting means of the ego-vehicle 2 by instructing the light control means 26 accordingly, the determined behavior communication means 23 may further be configured to determine an appropriate communication path out of a plurality of available communication paths. The determined behavior communication means 23 may additionally or alternatively be configured to employ car-to-x communication for communicating the ego-vehicle's determined behavior to the target vehicle 4. Hence the determined behavior communication means 23 may alternatively or additionally provide the communication information 28 to a car-to-x communication means 30. The car-to-x communication means 30 may generate a suitable communication signal comprising the information on the ego-vehicle's determined behavior for transmission to the target vehicle via at least one of a broadcast transmission and a point-to-point transmission. The car-to-x communication may include at least one of a direct transmission or a transmission over a relay, for example a relay provided by a traffic infrastructure. The transmission path may for example base on a wireless transmission via radio link between the ego-vehicle 2 and at least one target vehicle 4, 6.

Figure 6:
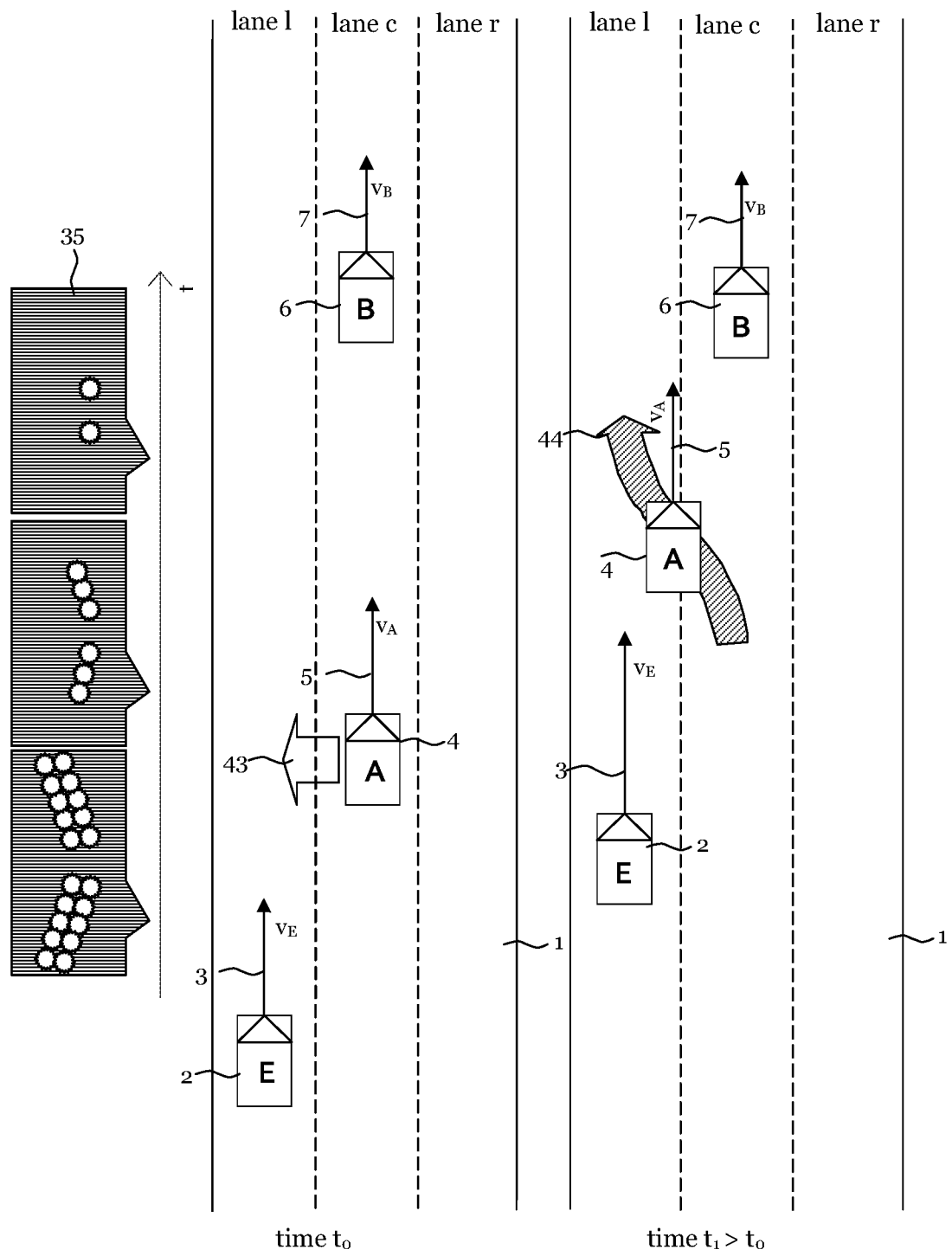
FIG. 6 shows a traffic situation with an ego-vehicle in an embodiment.

In FIG. 6, an exemplary traffic situation is shown with the vehicle 2 having an ADAS system according to an embodiment of the invention on board.

The traffic situation basically corresponds to the situation discussed in FIG. 1. However due to having an ADAS including the communication capability according to an embodiment of the invention available, the ego-vehicle 2 benefits from further options.

At a time $t_0$ the ego-vehicle 2 provides the actuation signal to the determined behavior communication unit 23. The determined behavior communication unit 23 may determine that the selected action of applying a mild brake in order to let the target vehicle 4 cut in is to be communicated to the target vehicle 4 in front of the ego-vehicle 2. The determined behavior communication unit 23 determines optical communication by modulating the headlamps 31, 33 to be available and the communication information "retreat" to be suitable to communicate the ego-vehicle's determined behavior of the ego-vehicle 2 to the target vehicle 4. Hence the communication information "retreat" is provided to the light control means 29. The light control means 29 issues the respective control signals to the headlamps 31, 33 to transmit the retreat signal 35 via modulating the light emission of the head lamps 31, 3 accordingly, while simultaneously applying a mild brake to maintain a fitting left gap for a predicted cut-in of the target vehicle 4. At a time $t_1 > t_0$ the target vehicle 4 is executing a cut in manoeuvre 44. The ego-vehicle 2 has adapted its velocity $v_E$ to the velocity $v_A$ of the target vehicle 4. By executing the selected action of letting vehicle 4 cut in while simultaneously signalling the executed determined behavior to vehicle 4, the traffic flow in the situation depicted in FIG. 6 is improved when compared to FIG. 1 and a potentially unclear and therefore endangering traffic situation evolvement is avoided.

Figure 7:
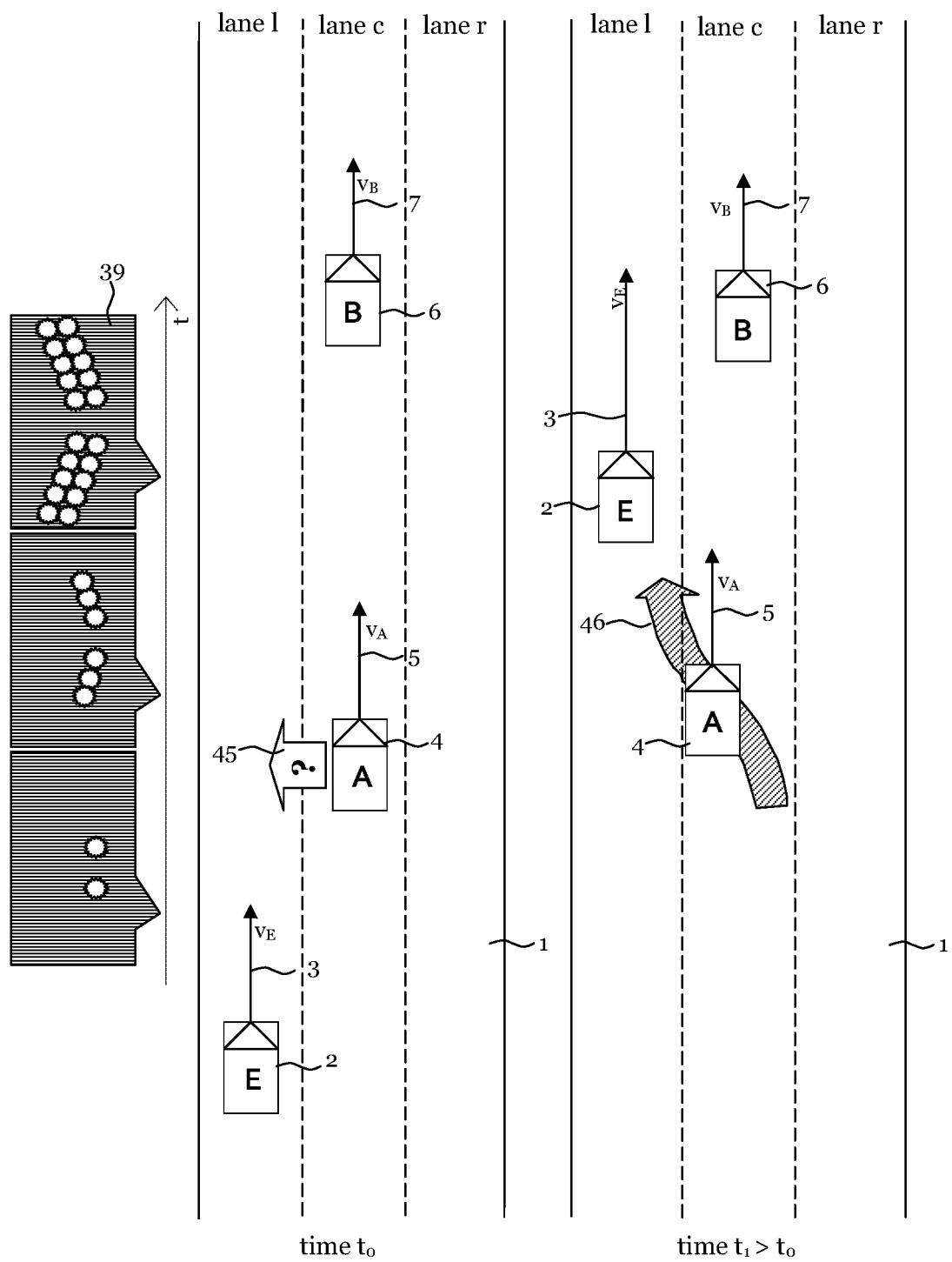
FIG. 7 shows another traffic situation with an ego-vehicle in an embodiment.

In FIG. 7, a further exemplary traffic situation is shown with the vehicle 2 having an ADAS system according to an embodiment of the invention on board.

The traffic situation basically corresponds to the situation discussed in FIG. 1. However contrary to the situation as continued in FIG. 6, in FIG. 7 the prediction result and the action determination based thereon guide the ego-vehicle 2 to resolve the potential cut-in situation at a time $t_0$ contrary to the action in FIG. 6.

At a time $t_0$ the ego-vehicle 2 provides the actuation signal to the determined behavior communication unit 23 not to adapt its velocity $v_E$ to the velocity $v_A$ of the target vehicle 4. The determined behavior communication unit 23 may determine that the selected action of continuing to cruise at the current speed of $v_E$ in order to overtake the target vehicle 4 is to be communicated to the target vehicle 4 to the front of the ego-vehicle 2. The determined behavior communication unit 23 determines optical communication by modulating the headlamps 31, 33 to be available and the communication information "approach" to be suitable to communicate the determined behavior of overtaking the target vehicle 4 of the ego-vehicle 2 to the target vehicle 4. Hence the communication information "approach" is provided to the light control means 29. The light control means 29 issues the respective control signals to the headlamps 31, 33 to transmit the approach signal 39 via modulating the light emission of the head lamps 31, 33 accordingly, while simultaneously continuing to cruise at the current speed $v_E$ on the left lane 1. Hence an initiating fitting left gap for a potential predicted cut-in of the target vehicle 4 rapidly closes. At $t_1 > t_0$ the target vehicle 4 is executing a cut in manoeuvre 46 behind the ego-vehicle 2. By executing the selected action of letting vehicle 4 not cut in while simultaneously signalling the executed determined behavior to vehicle 4, the traffic flow in the ambiguous situation depicted in FIG. 7, upper portion is improved when compared to FIG. 1 and a potentially unclear and therefore endangering traffic situation evolvement is avoided.

Figure 8:
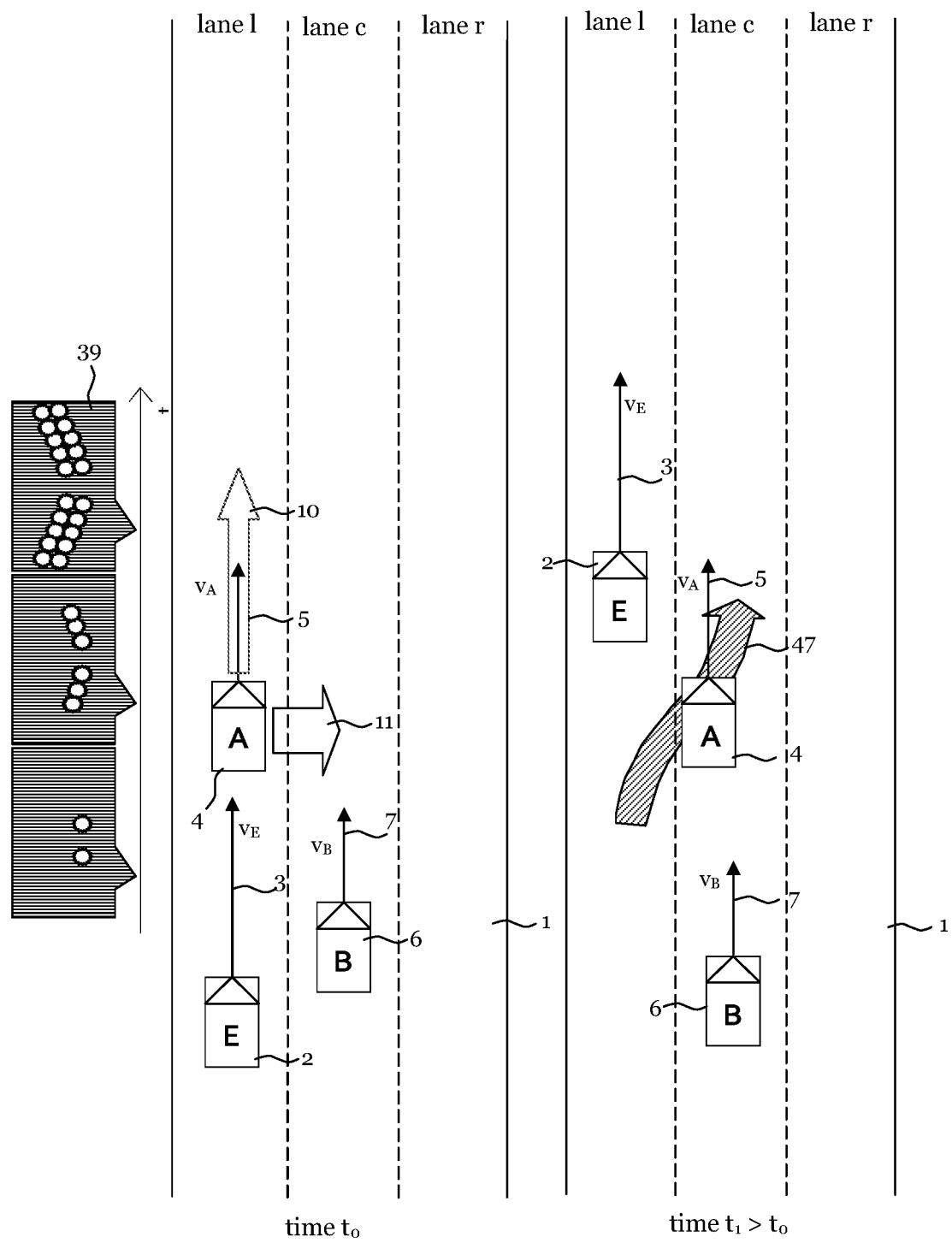
FIG. 8 shows yet another traffic situation with an ego-vehicle in an embodiment.

In FIG. 8, an exemplary traffic situation is shown with the ego-vehicle 2 having an ADAS system according to an embodiment of the invention on board.

The traffic situation basically corresponds to the situation discussed in FIG. 2. However due to having an ADAS including the communication capability according to an embodiment of the invention available, the ego-vehicle 2 profits from further options.

At a time $t_0$ the ego-vehicle 2 provides the actuation signal to the determined behavior communication unit 23 of not adapting its velocity $v_E$ to the velocity $v_A$ of the target vehicle 4. However the calculated prediction result comprises information that the target vehicle 4 could perform a cut-out maneuver. The determined behavior communication unit 23 may determine that the selected action of continuing to cruise at the present speed of $v_E$ in order to overtake the target vehicle 4 is to be communicated to the target vehicle 4 in front of the ego-vehicle 2 in order to prompt the target vehicle 4 to indeed execute the cut-out maneuver. The determined behavior communication unit 23 determines optical communication by modulating the headlamps 31, 33 to be available and the communication information "approach" to be suitable to communicate the ego-vehicle's determined behavior of overtaking the target vehicle 4 of the ego-vehicle 2 to the target vehicle 4. Hence the communication information "approach" is provided to the light control means 26. The light control means 26 issues the respective control signals to the headlamps 31, 33 to transmit the approach signal 39 via modulating the light emission of the head lamps 31, 33 accordingly, while simultaneously continuing to cruise at the present speed $v_E$ on the left lane 1. At $t_1 > t_0$ the target vehicle 4 is executing a cut-out manoeuvre 47 and therefore the ego-vehicle 2 is able to pass on the left lane 1 at an unchanged velocity $v_E$. By executing the selected action of signalling the vehicle 4 to cut-out while simultaneously signalling the executed determined behavior to vehicle 4, the traffic flow in the ambiguous situation depicted in FIG. 8, upper portion, is improved when compared to FIG. 2 and a potentially unclear and therefore endangering traffic situation evolvement is avoided.

While embodiments of the invention have been discussed with reference to the exemplary traffic scenes of FIGS. 1 and 2, it should be noted that the invention is likewise applicable also for a driving assistant which may not only be related to detecting moving objects in front of the ego-vehicle 2 and predicting a behavior thereof, but which may also be related to detecting and predicting moving objects in an area rearward of the ego-vehicle 2. As an example, an automatic cruise control may execute lane change maneuvers to give way to faster vehicles approaching from behind.

Likewise, the invention may be implemented with any kind of driver assistant related to predictions which includes not only cruise control, but many functions more, and which includes assistant functionalities to be developed in the future.

While the invention has been described with reference to its preferred embodiment, it is to be understood that this description is intended non-limiting and for illustrative purposes only. In particular, various combinations of features wherein the features have been described separately are apparent as advantageous or appropriate to the skilled man in the art, as the invention is intended to be limited only by the scope of the claims as appended.

The invention claimed is:

1. A method for communicating an ego-vehicle's determined behavior to a target object for use in a driver assistance system of an ego-vehicle, the ego-vehicle including at least one sensor, an electronic control unit (ECU), and one or more vehicle lights, the method comprising the steps of:
  acquiring, by the ECU, data describing a traffic scene in an environment of the ego-vehicle from the at least one sensor;
  calculating, by the ECU, a prediction result including the target object's behavior with at least one predicted maneuver of the target object based on the acquired data;

determining, by the ECU, an action to be performed by the ego-vehicle based on the prediction result and taking into regard the at least one predicted maneuver of the target object;

determining, by the ECU, communication information based on the determined action, wherein the communication information indicates the determined action; and outputting, by the ECU, the communication information to a communication module of the ECU for communication to the target object via the one or more vehicle lights, wherein the one or more vehicle lights communicate the communication information indicating the determined action to the target object by modulating at least one of a light emitting area and a light emitting position of the one or more vehicle lights by increasing a shape or a size of an active light emitting area on an entire light emitting area of the one or more vehicle lights observable by the target object in a first time sequence of light patterns emitted by the one or more vehicle lights which imitates the visual effect of the ego-vehicle approaching the target object located to the front of the ego-vehicle, or decreasing the shape or the size of the active light emitting area on the entire light emitting area of the one or more vehicle lights observable by the target object in a second time sequence of light patterns emitted by the one or more vehicle lights which imitates the visual effect of the ego-vehicle retreating from the target object located to the front of the ego-vehicle, and the one or more vehicle lights include at least one of one or more position lamps, one or more headlamps, one or more daytime running lamps and one or more driving lamps, and wherein the one or more vehicle lights begin to communicate the communication information to the target object before the target object begins to execute the at least one predicted maneuver.

2. The method according to claim 1, wherein the step of outputting the communication information further comprises outputting information about the determined action via the one or more vehicle lights of the ego-vehicle by modulating at least one of:
a light intensity,
a light color, and
an illumination direction of the one or more vehicle lights.

3. The method according to claim 1, wherein the one or more vehicle lights further include at least one of one or more side turn signals, one or more sequential turn signals, one or more brake lights, and one or more cornering lamps.

4. The method according to claim 1, wherein the step of outputting the communication information further comprises outputting information on the determined action according to a predetermined signalling pattern.

5. The method according to claim 4, wherein the predetermined signalling pattern includes at least one of:
a head light flashing with a short duration for signalling a possibility for a cut-in,
a head light flashing with a long duration or a high elevation illumination beam axis for signalling a danger of cutting in or a desire to overtake, and
using side turn signals for signalling a lane change in order to give way.

6. The method according to claim 4, wherein the predetermined signalling pattern includes further modulating the one or more vehicle lights in at least one of a light emitting surface position and a light intensity.

7. The method according to claim 1, wherein the method further comprises a step of assisting, by the driver assistance system, a driver in a lane change situation.

8. The method according to claim 1, wherein the prediction result includes information on a predicted future movement behavior of the target object.

9. A system included in an electronic control unit (ECU), the system adapted to communicate an ego-vehicle's determined behavior to a target object for use in a driver assistance system of the ego-vehicle, wherein the ego-vehicle includes at least one sensor, the ECU, and one or more vehicle lights, the system comprising:

acquisition means configured to acquire data of a traffic situation in an environment of the ego-vehicle;

prediction means configured to calculate a prediction result comprising information on a target object's behavior with at least one predicted maneuver of the target object based on the acquired data;

action determination means configured to determine an action to be performed by the ego-vehicle based on the prediction result and taking into regard the at least one predicted maneuver of the target object and to generate an actuation signal based on the determined action; and communication means configured to determine communication information based on the determined action, wherein the communication information indicates the determined action, and to output the communication information to the one or more vehicle lights for communication to the target object, wherein the one or more vehicle lights are configured to communicate the communication information indicating the determined action to the target object by modulating at least one of a light emitting area of the one or more vehicle lights observable by the target object by increasing a shape or a size of an active light emitting area on an entire light emitting area of the one or more vehicle lights in a first time sequence of light patterns emitted by the one or more vehicle lights which imitates the visual effect of the vehicle approaching the target object located to the front of the ego-vehicle, or decreasing the shape or the size of the active light emitting area on the entire light emitting area of the one or more vehicle lights in a second time sequence of light patterns emitted by the one or more vehicle lights observable by the target object which imitates the visual effect of the ego-vehicle retreating from the target object located to the front of the ego-vehicle, and the one or more vehicle lights include at least one of one or more position lamps, one or more headlamps, one or more daytime running lamps and one or more driving lamps, and wherein the one or more vehicle lights begin to communicate the communication information to the target object before the target object begins to execute the at least one predicted maneuver.

10. A vehicle including the system according to claim 9, configured to communicate the vehicle's determined behavior to a target object, wherein the vehicle is the ego-vehicle.

* * * * *